United States Patent [19]
Gallington

[11] 3,880,002
[45] Apr. 29, 1975

[54] ROTARY ANGLE OF ATTACK INDICATOR

[76] Inventor: Roger W. Gallington, Qtrs. 4307 H, U.S. Air Force Academy, Colo. 80840

[22] Filed: Aug. 28, 1973

[21] Appl. No.: 392,397

[52] U.S. Cl. .................................................. 73/180
[51] Int. Cl. .......................................... G01c 21/00
[58] Field of Search ..................... 73/180, 188, 189

[56] References Cited
UNITED STATES PATENTS

| | | | |
|---|---|---|---|
| 2,029,700 | 2/1936 | Boykow | 73/180 |
| 2,923,152 | 2/1960 | Mabry, Jr. et al. | 73/180 |
| 3,500,685 | 3/1970 | Gwathmey | 73/180 |

*Primary Examiner*—Donald O. Woodiel
*Attorney, Agent, or Firm*—Arsen Tashjian

[57] ABSTRACT

An angle of attack indicator for use as a cockpit instrument including movable elements which respond to the differences in pressure at various points on the leading edge of the aircraft wing. The operation of the indicator is based on the principles that (1) as the angle of attack of the wing is increased, the point of maximum pressure on the wing moves down around the leading edge thereof, and (2) in the region of the point of maximum pressure, the pressure decreases as one moves away from the point of maximum pressure.

3 Claims, 5 Drawing Figures

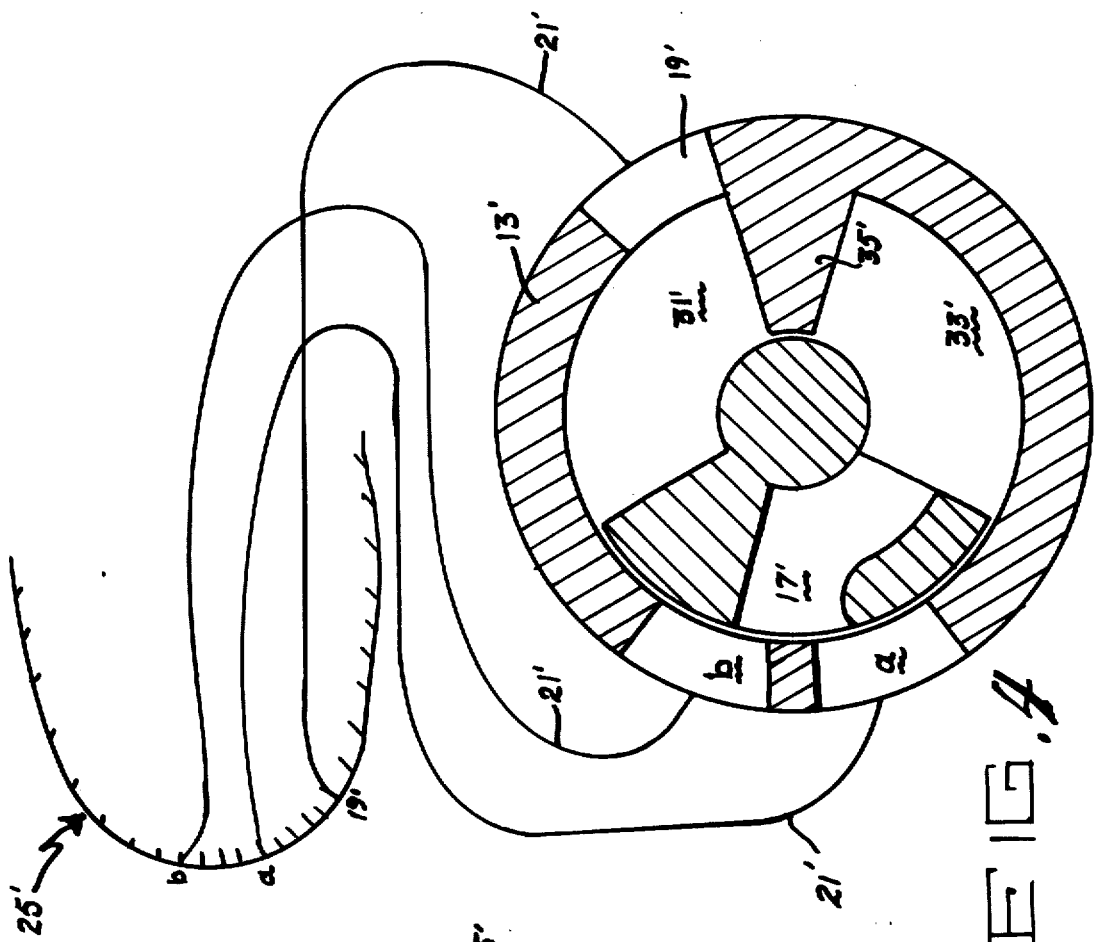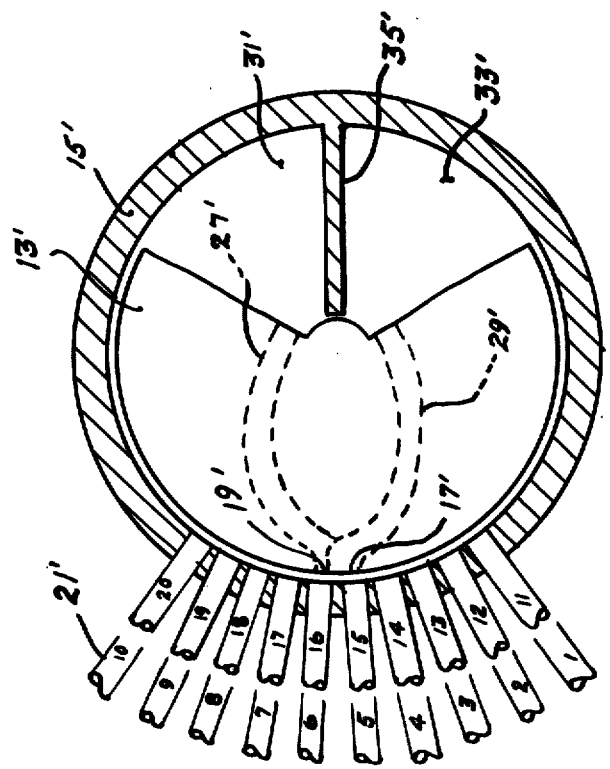

ROTARY ANGLE OF ATTACK INDICATOR

BACKGROUND OF THE INVENTION

This invention relates to an angle of attack indicator and, more particularly, the invention is concerned with providing a rotary type instrument for use on aircraft to give an indication of the angle of attack based on movement of the point of maximum pressure down around the leading edge of the wing as the angle of attack is increased and the pressure decreases as one moves away from the point of maximum pressure.

The "angle of attack" may be defined as the term given to the angle of air flow relative to the chord line of a wing. This value is critical during most phases of flight especially including takeoff, climb, cruise, glide, approach, missed approach and landing. In takeoff the normal procedure is to head the aircraft down the runway at full throttle and accelerate the aircraft to takeoff airspeed and then apply a slight amount of back pressure to the control column. The airspeed must then increase to a point of providing sufficient lift to support the aircraft in flight. Since we are depending on airspeed alone, the lift-off point is rather uncertain and can be unnecessarily delayed by too little or too much back pressure on the control column. Too little back pressure will cause the aircraft to attain higher than normal spped before sufficient lift is obtained. This can produce a time delay and result in the use of additional runway. Too much back pressure to the control column will cause a decrease in the forward velocity of the aircraft because of the increase in drag, resulting in a loss of lift and an aborted takeoff.

Since the wing lift is related to its angle of attack, an indication of this angle to the pilot can improve his takeoff procedure and make his control function positive. The takeoff procedure utilizing the angle of attack information would be to proceed down the runway while accelerating to the takeoff airspeed recommended for the particular aircraft and then apply a steadily increasing back pressure to the control column while referring to the angle of attack indicator. Utilizing this procedure, the aircraft will become airborne when its wing angle of attack is the proper value for sustaining lift. By following the above procedure the aircraft will become airborne in the least distance with a positive reference to the actual wing lift.

During final approach and landing, it is important to maintain the aircraft at the minimum maneuvering airspeed which is normally 30 per cent above stall airspeed. The actual airspeed is a compromise at the discretion of the pilot to compensate for varying conditions of aircraft load, weather and wind velocity and wind shear. However, because of the aircraft's inertia as well as the natural lag in response of the airspeed, it is difficult for the pilot to keep the airspeed constant and, consequently, keep the glide angle constant. Thus, it would be desirable to provide an angle of attack indicating system which is instantaneously responsive so that the pilot could maintain the aircraft at the best approach angle of attack and, therefore, a constant glide angle. This would enable the pilot to fly the aircraft closer to the stall angle with confidence especially if it were necessary to land in a relatively short runway distance.

SUMMARY OF THE INVENTION

The present invention is concerned with providing a rotary angle of attack indicator for use in inexpensive aircraft or aircraft operating in severe conditions, such as, icing, rough ground handling, combat, etc. The operation of the indicator is based on the principles that (1) as the angle of attack of the wing is increased, the point of maximum pressure on the wing moves down around the leading edge thereof, and (2) in the region of the point of maximum pressure, the pressure decreases as one moves away from the point of maximum pressure.

Accordingly, it is an object of the invention to provide a rotary angle of attack indicator based on the principles that (1) as the angle of attack of an aircraft wing is increased, the stagnation point moves down around the leading edge curvature and (2) the pressure decreases as one moves away from the stagnation point along the wing surface.

Another object of the invention is to provide a rotary angle of attack indicator that is inexpensive to manufacture yet is reliable and rugged, making it especially suitable for use in relatively inexpensive aircraft. The pilots of lighter military aircraft can be provided with an angle of attack indicator thereby leading to more accurate approaches with fewer missed approaches.

Still another object of the invention is to provide a rotary angle of attack indicator including a rotor having two spaced inlets in communication with two corresponding chambers which are separated by a divider. As the rotor moves, the inlets become aligned with different pairs of tubes leading from the wing area until equilibrium is reached. The position of the rotor is a direct indication of the angle of attack.

A further object of the invention is to provide a rotary angle of attack indicator wherein the rows of tubes leading from the wing to the instrument case are doubled to reduce the internal leakage area and increase the possible arc of rotation of the rotor.

A still further object of the invention is to provide a rotary angle of attack indicator wherein the range of movement is increased while fewer machining operations are required and internal leakage areas are reduced. Capillary fluid is used to seal the internal leakage gaps.

Another still further object of the invention is to provide a rotary angle of attack indicator with a reduced number of tubes and wing static pressure ports. The operation is based on the throttling action of the partially closed inlets or rotor ports so that the pressure on a now-throttling port is between two static pressures available to the throttling port to thereby place the rotor in equilibrium condition.

These and other objects, features, and advantages will become more apparent after considering the following detailed description taken in conjunction with the annexed drawings and appended claims.

BRIEF DESCRIPTION OF THE DRAWINGS

FIG. 2 is a schematic view of an improved embodiment of the invention wherein the tubes from the aircraft wing are positioned in a double row on the cockpit instrument to increase the possible arc of rotation of the rotor;

FIG. 4 is a schematic view of still another embodiment of the invention having a greatly reduced member of tubes and wing static ports and wherein its operation is based on the throttling action of partially closed rotor ports.

DESCRIPTION OF PREFERRED EMBODIMENTS

Figure 1:
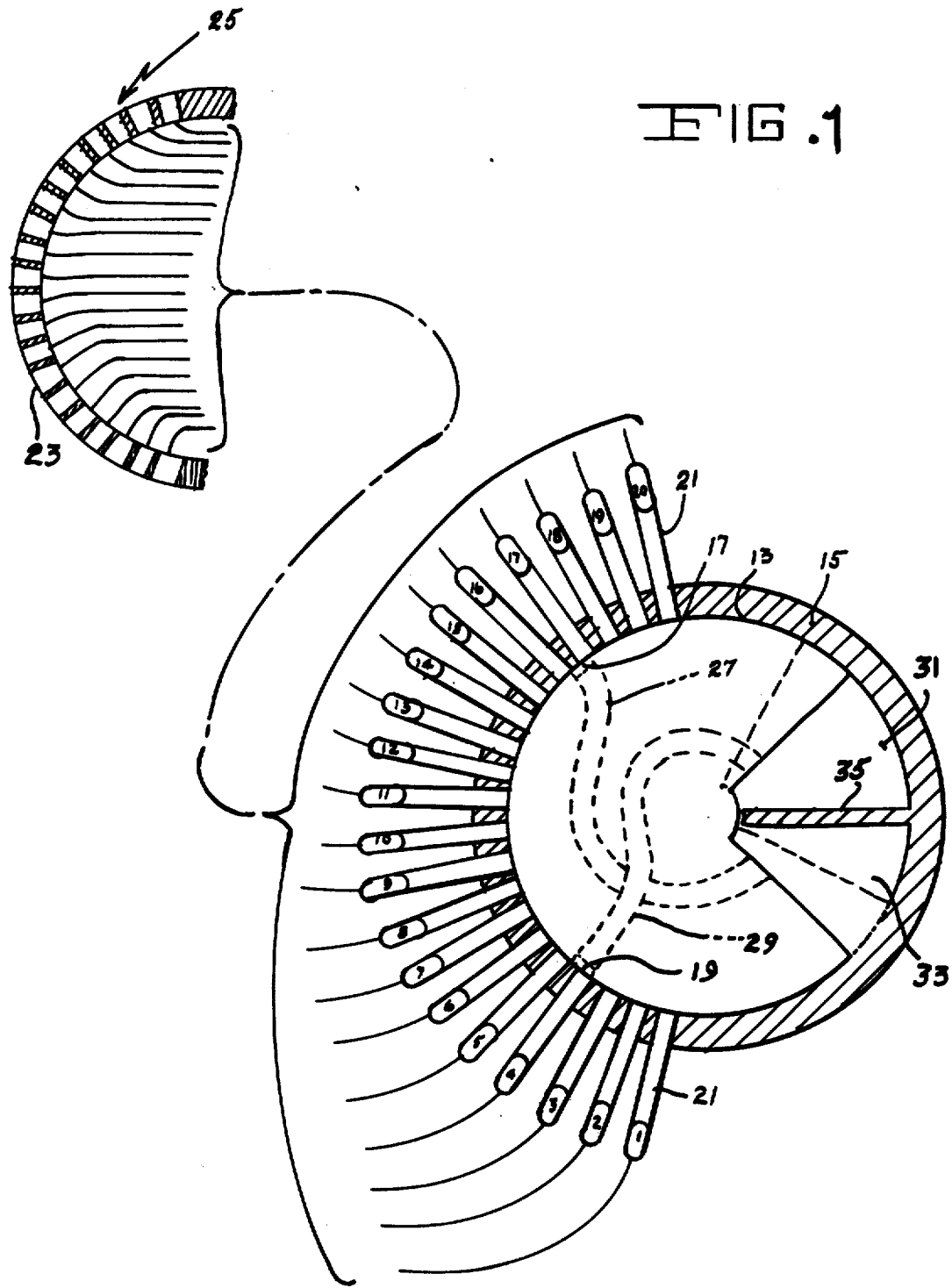
FIG. 1 is a schematic view of a rotary angle of attack indicator according to the invention showing the plurality of tubes from the wing to the cockpit instrument with the rotor in the case.

Referring now to the drawings, in FIG. 1 there is shown one of the preferred embodiments of the invention which indicates the angle of attack of an aircraft. As the rotor 13 moves on low friction bearings which support it slightly away from the case 15, the rotor ports 17 and 19 line up with different pairs of tubes 21 and corresponding static pressure ports 23 on the wing leading edge 25. The portion of the wing leading edge 25 containing the pressure ports 23 must be heated if the instrument is to be used in icing conditions.

The rotor ports 17 and 19 are connected via the internal air passages 27 and 29 to the chambers 31 and 33, respectively. Chambers 31 and 33 are separated by divider 35. The rotor 13 can only be in equilibrium if the pressures in chambers 31 and 33 are equal which, in turn, requires that the pressures at the rotor ports 17 and 19 be equal. Since the rotor ports 17 and 19 are lined up with two of the tubes 19, the pressure in these two tubes 19 and at the two corresponding pressure ports 23 must be equal. This can only be true if the stagnation point is between the two ports indexed. For if the stagnation were not between the two ports indexed, the pressure at the one further from the stagnation point would be lower than the pressure at the one nearer the stagnation point by virtue of the fact that the pressure decreases as one moves away from a stagnation point.

To see that the instrument is stable, consider what happens if the rotor 13 is displaced from the equilibrium position. If the rotor 13 should become displaced to the position indicated by the broken lines in FIG. 1, rotor port 17 will line with No. 14 tube 21, and corresponding static pressure port 23 nearer the stagnation point and consequently at a greater pressure, while rotor port 19 will line up with No. 2 tube 21 and corresponding static pressure port 23 farther from the stagnation point and consequently at a lower pressure. Thus, the pressure in chamber 33 will exceed the pressure in chamber 31 tending to return the rotor to its original position.

Now consider what happens if the angle of attack of the wing 25 should increase thus causing the stagnation point to move down around the leading edge curvature. The pressure on the lower static pressure port 23 whose tube is aligned with rotor port 19 will be increased thus increasing the pressure in chamber 31, while the pressure on the upper static pressure port 23 whose tube is aligned with rotor port 17 will be reduced thus reducing the pressure in chamber 33. As chamber 31 will have a higher pressure than chamber 33 the rotor 13 is encouraged to rotate counterclockwise seeking a new equilibrium position. In a sense, the rotor 13 "chases" the stagnation point around the leading edge of the wing 25. Since the position of the stagnation point depends only on the angle of attack, the position of the rotor 13 can be correlated directly with the angle of attack.

Figure 3:
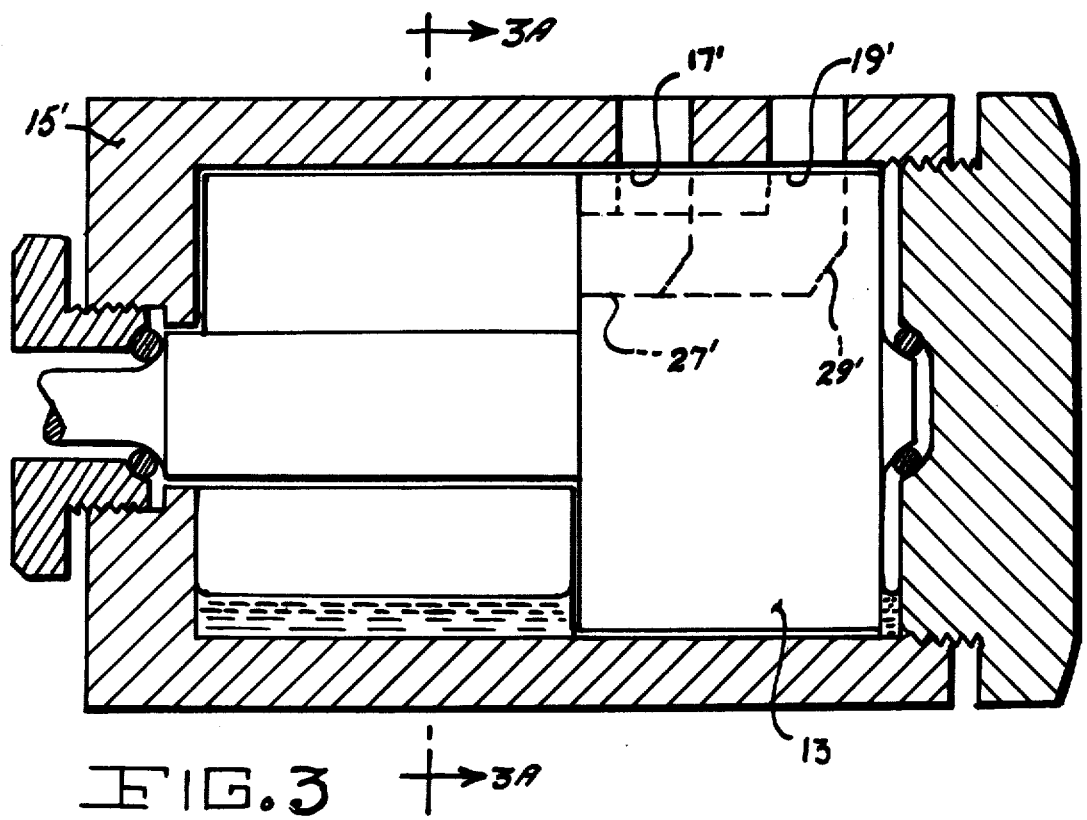
FIG. 3 is a view in cross section of another embodiment of the invention wherein the machining operations are reduced and a capillary liquid is used for sealing the internal leakage gaps.
Figure 3A:
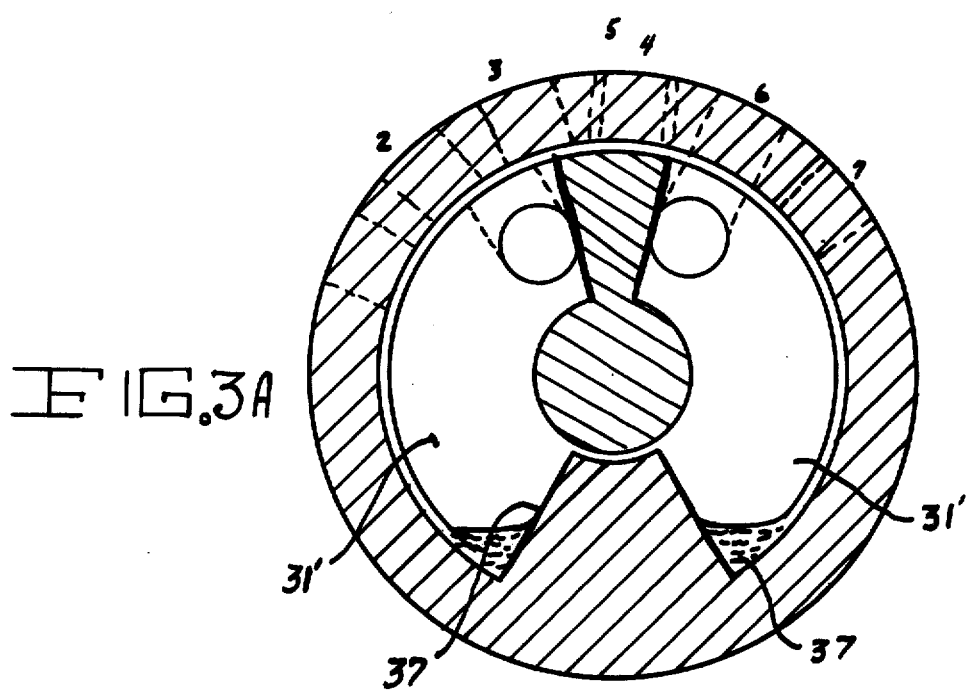
FIG. 3A is a cross sectional view of the embodiment of FIG. 3 taken along the line 3A—3A.

FIG. 2 is a schematic view of an improved embodiment of the invention showing the row of tubes 21' doubled where they fasten to the case 15' to reduce the internal leakage area and increase the possible arc of rotation of the rotor 13'. Thus, it can be seen that, although the instrument as shown in FIG. 1 would work in principle, the rotary angle of attack indicator herein disclosed can appear in many geometries. In the embodiment shown in FIGS. 3 and 3A, the instrument is designed to reduce the machining operations required and further reduce the internal leakage area while increasing the range of movement. Also, in FIG. 3 there is indicated the use of capillary fluid 37 for sealing the internal leakage gaps.

In FIG. 4 there is shown a schematic view of an embodiment of the invention having a greatly reduced number of tubes 21' and wing static ports a, b, and 19'. The operation of this embodiment is based on the throttling action of the partially closed rotor ports 17'. As the stagnation point moves up around the leading edge curvature 25, the pressure at port 19' is reduced while the pressure at rotor port 17' is increased. The rotor 13' then moves clockwise tending to open rotor port 17' to a static pressure port farther from the stagnation point. Provided that the static pressure ports 23' are positioned in such a way that the pressure on the now-throttling port 19' is between the two static pressures available to the throttling port 17', the rotor 13' can find an equilibrium position and will indicate the angle of attack as before. This throttling concept can be used with an indicator of more than three tubes to "smooth" the response of the instrument and improve its accuracy.

Although the invention has been illustrated and described in terms of preferred embodiments thereof, it will be apparent to those skilled in the art that certain changes, alterations, modifications, and substitutions, particularly with respect to the construction details, can be made in the arrangement and location of the various pressure sensings elements without departing from the true spirit and scope of the appended claims.

Having thus set forth and disclosed the nature of my invention, what I claim is:

1. A rotary angle of attack indicator for use in an aircraft cockpit instrument comprising, a case, a divider for separating the interior of said case into at least two chambers, a rotatable member disposed in said case including a rotor having two rotor ports on the outer periphery thereof, and an internal air passage leading from each of said rotor ports to separate chambers in said case, a plurality of pressure sources located on the leading edge of the aircraft wing, and means for transmitting the pressures from the aircraft wing to the chambers in said case including a series of tubes positioned along one side of said case and passing therethrough to communicate with said rotor ports and pressurize said chambers, such that variations in pressures produce a corresponding rotation of the rotatable member which is proportional to the angle of attack of the aircraft.

2. The rotary angle of attack indicator defined in claim 1 wherein the rotor ports on the outer periphery of the rotor are located one adjacent over the other, said series of tubes being arranged in a double row on the side of the case, each of said rotor ports operatively communicating with a preselected tube so that pressure variations therein effectively produce corresponding rotation of the rotor.

3. The rotary angle of attack indicator defined in claim 1 wherein one of said rotor ports is partially closed to provide a throttling action for producing a smoother response to pressure variations being transmitted from the leading edge of the wing.

* * * * *